W. H. FROST.
MOUNTING OF ENGINES IN MOTOR CARS.
APPLICATION FILED APR. 27, 1912.
1,076,415.
Patented Oct. 21, 1913.
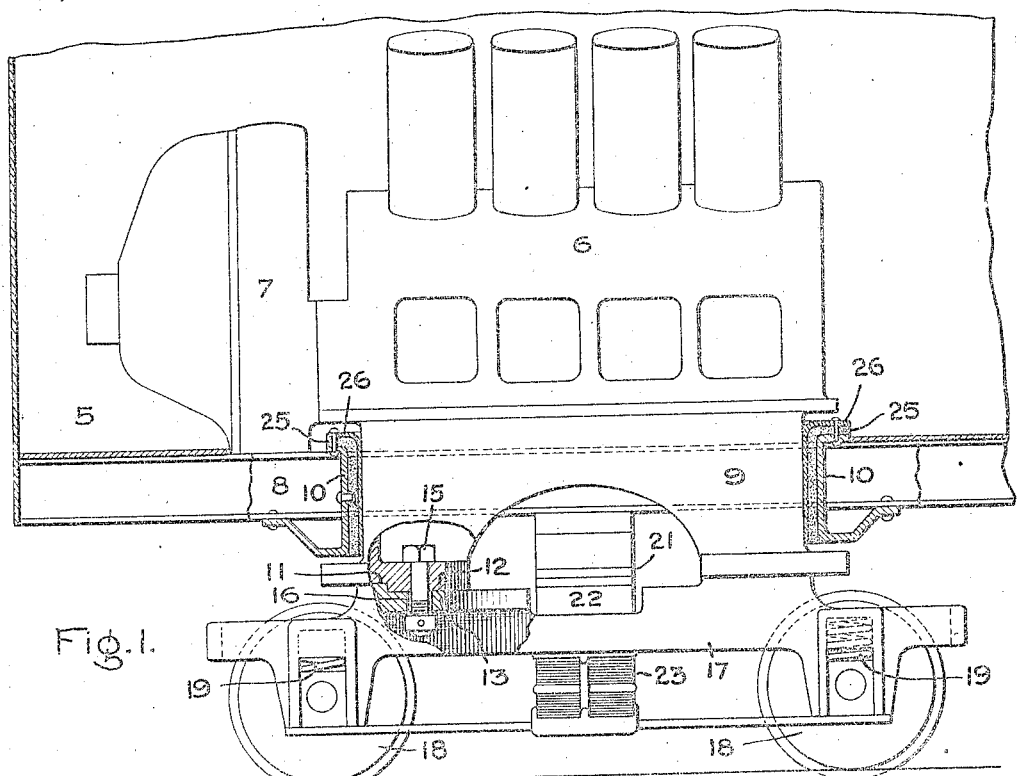
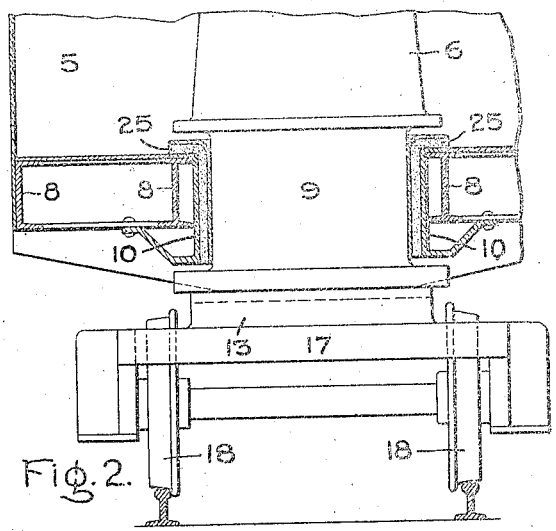
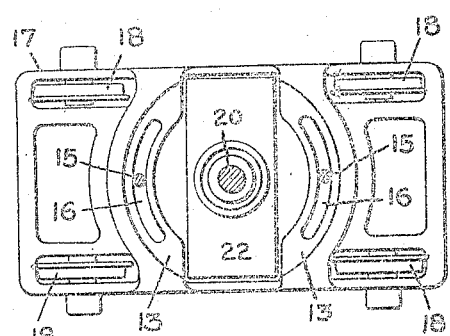
Witnesses:
Inventor:
William H. Frost,
by ......
Att'y.

UNITED STATES PATENT OFFICE.

WILLIAM H. FROST, OF ERIE, PENNSYLVANIA, ASSIGNOR TO GENERAL ELECTRIC COMPANY, A CORPORATION OF NEW YORK.

MOUNTING OF ENGINES IN MOTOR-CARS.

1,076,415.  Specification of Letters Patent.  Patented Oct. 21, 1913.

Application filed April 27, 1912. Serial No. 693,612.

*To all whom it may concern:*

Be it known that I, WILLIAM H. FROST, a citizen of the United States, residing at Erie, county of Erie, State of Pennsylvania, have invented certain new and useful Improvements in Mountings of Engines in Motor-Cars, of which the following is a specification.

The present invention relates to motor cars wherein an internal combustion engine is employed to drive a generator which in turn supplies current to electric motors mounted on one or more of the trucks thereof.

The object of my invention is to provide a support for said engine of improved construction whereby it may be mounted directly on one of the trucks, as distinguished from mounting it on the car body, and at the same time be prevented from turning angularly with the truck as the latter swivels under the car in going around curves. In other words while the engine is so positioned as to extend into the cab of the car it preserves a given position therein instead of swinging angularly with the truck. Such an arrangement avoids the use of flexible connections capable of great movement between the engine and fixed parts carried by the cab.

In the accompanying drawing which illustrates one of the embodiments of my invention, Figure 1 is a partial end view of the cab of a motor car; Fig. 2 is a transverse section thereof, and Fig. 3 is a plan view of the engine supporting truck on a reduced scale.

5 indicates the cab portion of a motor car, and located within it is a multi-cylinder internal combustion engine 6 that is directly connected to the electric generator 7, the latter being adapted to supply current to electric motors mounted on one or more of the trucks. The car is provided with longitudinal sills 8 and between the two center sills the engine is located. Instead of being carried by the sills, however, it is mounted directly on the truck. To this end the engine is provided with a sub-base 9 that is bolted to the main base or frame thereof. This sub-base is rectangular in shape and extends between the longitudinal sills 8 and transverse bars or braces 10 which are bolted to the sills. The sub-base is provided with two horizontal bearing surfaces 11 and 12 that rest on a turntable 13 carried by the truck. The surfaces of the turntable are concentric with the center or pivot pin which connects the truck with the car body. Owing to the fact that the position of the engine coincides with that of the body bolster, it is necessary to have the sub-base of the engine straddle it so that the said bolster can move up and down as its supporting springs yield without striking any portion of the engine. In order to prevent the engine from getting off of the turntable, bolts 15 are provided. They are carried by the sub-base and enter curved slots 16 formed in the turntable portion of the truck.

The truck may be of any suitable construction. As shown it is provided with a main rectangular frame 17 and four track wheels 18, the latter being mounted on the axles in the usual manner. The truck frame is supported upon the axles by suitable heavy coiled springs 19. The turn table 13 is formed on the upper surface of the truck and is concentric with the center pin 20 and the center plate 21 carried by the truck bolster 22. This bolster is supported by the body springs 23 and is guided in any suitable manner. It will thus be seen that the weight of the engine is directly supported by the turntable on the truck while that of the body is supported by the floating bolster. The center of gravity of the engine or engine and generator should be located as nearly as possible over the center of the center pivot pin 20 to distribute the load uniformly on the truck.

It is evident that with the engine mounted directly on the truck it would tend to move angularly with the truck as the latter follows the curves in the track. This is objectionable because it is undesirable to have a large heavy mass shifting back and forth in a small cab, and because it necessitates the use of flexible connections between the engine and the stationary parts of the cab having a wide range of movement. For example, such connections would have to be included in the pipe conveying fuel to the engine, in the pipes conveying circulating water to and from the engine, and in the exhaust pipe. In order to prevent the engine from turning with the truck it is held between the side sills 8 and the end bars 10, said sills and bars forming a rectangular opening, which is only slightly larger than the sub-base of the engine.

It is important to prevent the transmission of engine vibrations to the car body which would cause discomfort and annoyance to the passengers. To this end cushions are located at the sides and ends of the sub-base and between it and the adjacent parts of the car body. Such cushions can, with advantage, be made of strips of thick, dense felt 25. This felt is suitably attached to the parts of the car body and between it and the sub-base of the engine are protecting strips 26 that protect the same from injury. The felt is preferable under compression so that there will be no substantial amount of lost motion between the car body and the engine. The felt should be under a relatively low compression, so as to limit as much as possible the tendency of the engine to move independently of the car body, and to avoid the transmission of engine vibration which would take place if the compression were too high.

It will thus be seen in my improved engine mounting that the weight of the engine is directly supported by the truck, that the engine is located within the cab where it is accessible and well protected, and that the truck, by reason of the turntable construction, is permitted to turn under the engine, said engine being held against angular movement by means carried by the car body. This arrangement also enables me to use similar springs on the forward and rear trucks for supporting the car body whereby its riding qualities are improved.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In combination, a truck, a car body supported thereby, a turntable on the truck, an engine mounted on the turntable, and means for preventing the engine from turning angularly with the truck.

2. In combination, a truck, a car body supported thereby, a turntable on the truck, an engine that is seated on the turntable, and means carried by the car body for holding the engine against angular movement and permitting the truck to turn under it.

3. In combination, a truck, a spring supported bolster therefor, a car body, a bolster therefor, a center plate and pivot pin between the bolsters, a turntable carried by the truck, and an engine mounted on the turntable that straddles the body bolster.

4. In combination, a truck, a spring supported bolster therefor, a car body, a bolster therefor, a center plate and pivot between the bolsters, a turntable carried by the truck, an engine mounted on the turntable that straddles the body bolster, and means carried by the body for preventing the engine from turning angularly with the truck.

5. In combination, a truck, a car body supported thereby, a turntable mounted on the truck, an engine that is seated on the turntable and projects upward into the car, means for preventing the engine from turning with the truck, and cushions between the engine and said means.

6. In combination, a truck, a car body supported thereby, a turntable mounted on the truck, an engine that is mounted on the turntable, means for preventing the engine from moving angularly, cushions between the engine and means, and plates for protecting the cushions.

7. In combination, a truck, a car body supported thereby, a turntable mounted on the truck, an engine mounted on the turntable, means to limit the lifting movement of the engine with respect to the turntable, and means to prevent the engine from turning angularly with the truck.

8. In combination, a truck, a car body supported thereby, a turntable mounted on the truck, an engine located within the car body, a sub-base for the engine that rests on the turntable, and means carried by the sills of the car body for preventing the sub-base from turning with the truck.

In witness whereof, I have hereunto set my hand this 25" day of April, 1912.

WILLIAM H. FROST.

Witnesses:
DORMON WEAVER,
JOHN G. FARRAR.